June 23, 1936.  R. D. SMITH  2,045,108
TURNING ALIGNMENT GAUGE
Filed Jan. 16, 1933  2 Sheets—Sheet 1

R. D. SMITH INVENTOR
BY
Merrill M. Blackburn
ATTORNEY

June 23, 1936.                    R. D. SMITH                    2,045,108
                             TURNING ALIGNMENT GAUGE
                            Filed Jan. 16, 1933          2 Sheets-Sheet 2

R. D. SMITH   INVENTOR

BY

Merrill M. Blackburn,
                    ATTORNEY

Patented June 23, 1936

2,045,108

UNITED STATES PATENT OFFICE 2,045,108

TURNING ALIGNMENT GAUGE

Roy D. Smith, Davenport, Iowa, assignor to Bee Line Manufacturing Company, a corporation of Iowa Application January 16, 1933, Serial No. 651,907

10 Claims. (Cl. 33—203)

The present invention relates to a gauge for checking the turning alignment of the front wheels of a motor vehicle and comprises among its objects the provision of means whereby the wheels of the motor vehicle may be supported for free movement forwardly, backwardly, laterally, or rotationally; the provision of means whereby the tread of the vehicle may be readily measured; the provision of means whereby the turning angle of the respective wheels may be measured; and such further objects, advantages, and capabilities as will hereafter appear and as are inherent in the construction disclosed herein. My invention further resides in the combination, construction, and arrangements of parts illustrated in the accompanying drawings and, while I have shown therein what is now considered the preferred embodiment of this invention, I desire the same to be understood as illustrative only and not to be interpreted in a limiting sense.

In the drawings annexed hereto and forming a part hereof,

Figure 1:
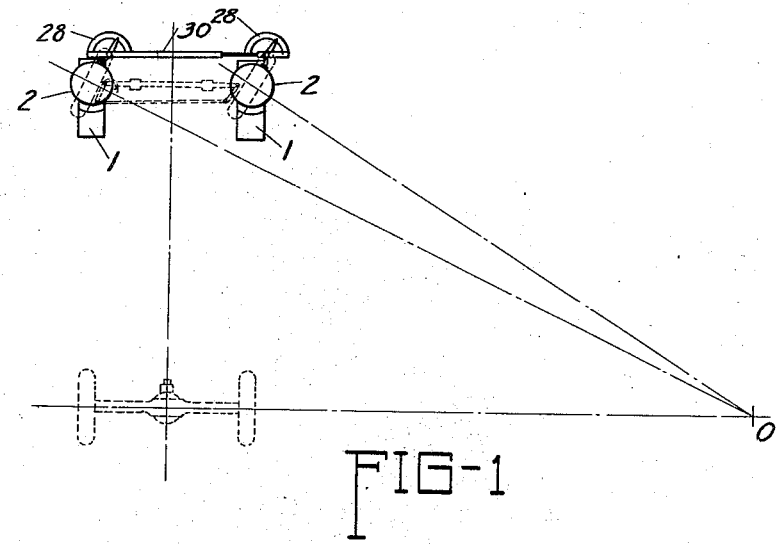
Fig. 1 is a diagrammatic plan intended to show what takes place when the steering wheel of an automobile is turned in the act of steering the vehicle.

It is a well known fact that the front wheels of a motor car are normally not parallel to each other but are set with a certain angle to each other which is referred to as "toe-in". It is also a self-evident fact that when the wheels are turned to steer the vehicle to the right or left, the wheel upon the inside of the curve must turn upon a shorter radius of curvature. This is illustrated in Fig. 1 by the dotted lines through the centers of the wheels and meeting in the point 0 at the right side of the figure. It is apparent that this point 0 lies in the prolongation of the axis of the rear axle and constitutes the center about which the front wheels of the vehicle turn. It is also evident that when the front wheels are turned less than illustrated in Fig. 1, the point 0 will be farther away from the vehicle than when the wheels are turned to the extent illustrated in Fig. 1. Also, the distance of the point 0 from the longitudinal axis of the vehicle, for any degree of turning, will vary with the wheel base of the car, the tread thereof, and the king pin inclination. In checking the correctness of the positions of the front wheels, it is therefore important to know these three factors.

Each of the main supporting elements comprises a base 1 and a movable wheel-supporting element 2. The base 1 includes a platform 3 supported by side flanges 4 and transverse reenforcing members 5. An inclined runway or approach 6, whose upper end is supported by a support 7, serves as an approach whereby the wheels 8 of vehicles may reach their position on the wheel-supporting element 2. A turntable supporting element 9 is mounted upon the platform 3 and is illustrated as being secured thereto by means of screws 10 which extend into a ring 11, integral with the table 9 or more or less permanently secured thereto. It is obvious that a series of posts may replace the ring 11 and that the substitution thereof would not amount to invention. A downwardly extending boss 12 is formed on the under side of the plate 9 and has an opening therethrough for the passage of the centering pin 13 which may be actuated by means of the lever 14 into either elevated or depressed position. The purpose of this pin will be referred to more fully hereinafter.

The wheel-supporting element 2 comprises upper and lower elements 15 and 16, the latter of which is a flat annulus which is secured to the downwardly extending flange 17 of the upper member by means of screws 18, or the like. The annular member 16 has an internal diameter which is less than the diameter of the plate 9 and it is so positioned that, when it moves laterally or is rotated, it will be substantially free from contact with the plate 9. However, if the member 2 is lifted, the annulus 16 will engage the under side of the plate 9 and prevent separation of the two. It will be seen from Figs. 3 and 4 that between the plate 16 and the body of member 2 there is a concavity within which the plate 9 is located. It will also be seen that the under side of the body member is substantially flat except at its central portion which is provided with a boss, centrally apertured for reception of the pin 13.

The purpose of this pin is to hold member 2 centrally positioned with relation to member 1. After an automobile has been driven into position so that its front wheels are located on the gauge element, as indicated in Fig. 5, one of the levers 14 is actuated to withdraw the pin 13, thus releasing the gauge element for free movement in any direction in which it has a tendency to move. Such movement is facilitated by means of the balls 20 which are held spaced by the spacing plate 21. From Figs. 3 and 4, it will be apparent that the movable member 2 may have easy free movement in any horizontal direction, including a motion of rotation.

Figures 2, 3:
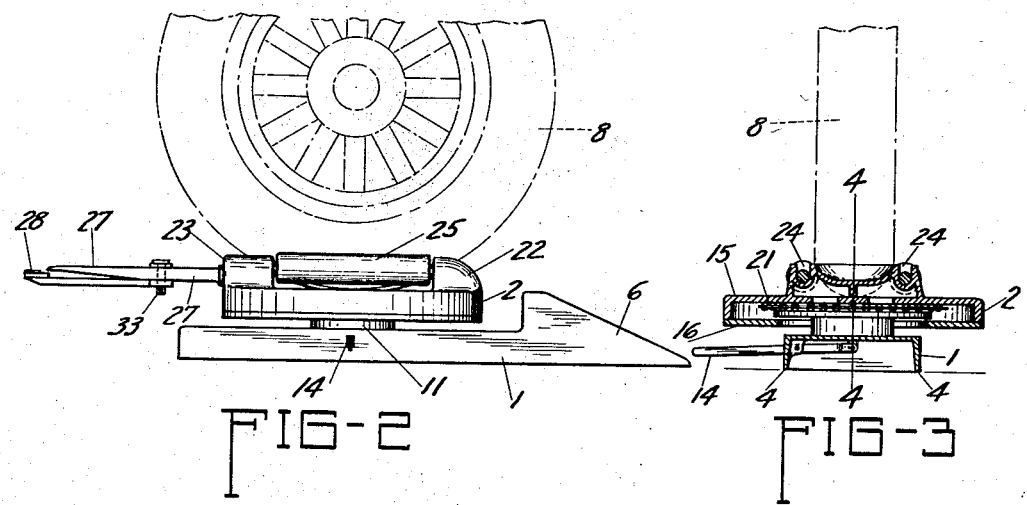
Fig. 2 is a side elevation of one of the gauge elements, with an automobile wheel shown in dotted outline in position thereon.
Fig. 3 is a transverse section substantially along the broken plane indicated by the line 3—3, Fig. 4.
Figure 4:
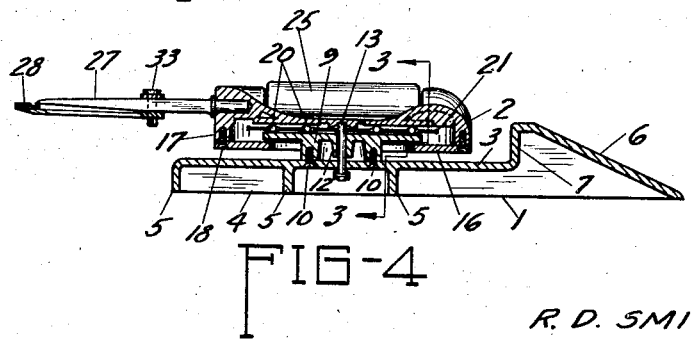
Fig. 4 is a section at a right angle to the section of Fig. 3, the same being taken substantially along the plane indicated by the line 4—4, Fig. 3.
Figure 5:
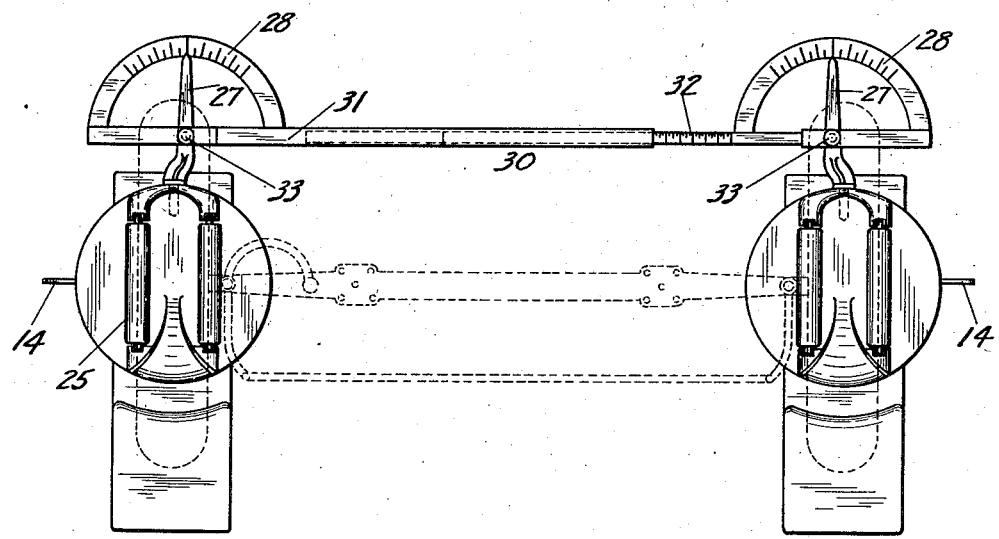
Fig. 5 is a plan view of my new gauge, the same illustrating the position of the parts when the wheels of the vehicle are positioned to run straight ahead or backward.

As shown in Figs. 2, 3, and 4, the top of member 2 is concave for the reception of the vehicle wheel and is provided with bosses 22 and 23 which have openings 24 therein for the reception of the axles of the rollers 25. These rollers make it easy for the wheels to settle down into the concavities in the upper surfaces of members 2. Therefore, if the gauges do not happen to be spaced exactly right for the tread of the vehicle, when the pin 13 is withdrawn from the depression in the under face of member 2, a roller 25 will turn as the member 2 moves sidewise and the vehicle wheel will settle down into the concavity. Also, if the element 2 were not turned so as to line up with the tires, the rollers 25 and the ball bearings 20 make it easy to rotate the turntable until the tire fits exactly between the rollers. This action is entirely automatic and requires no attention from the operator as the wheels of the vehicle cause the turntable to line up with the tires.

Figure 6:
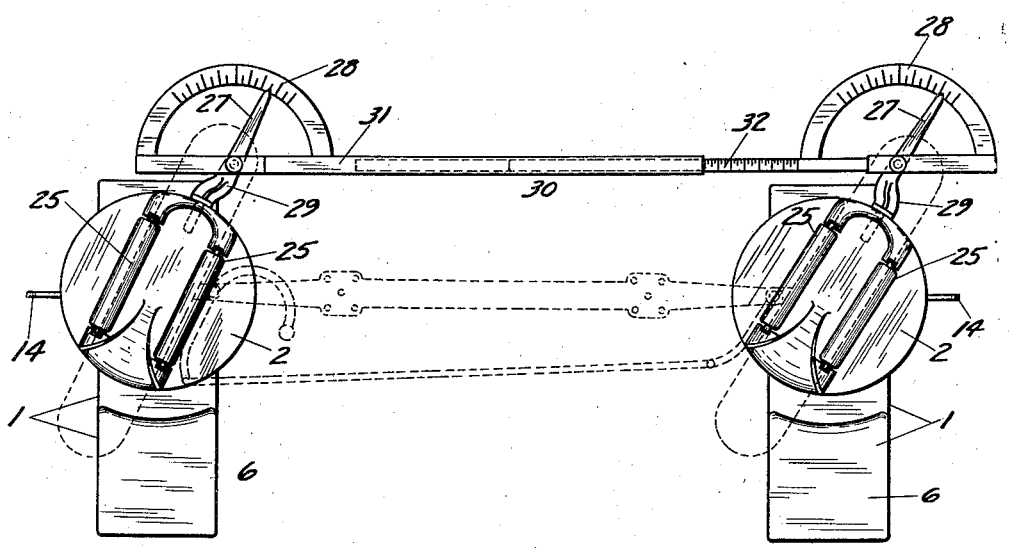
Fig. 6 is a view similar to Fig. 5 but showing the positions of the parts when the wheels are turned, as in the act of steering the car to the right.

Each of arms 27 has an end inserted in an opening in member 2 and therefore serves as a pointer to indicate on the scale 28 the amount of rotation of member 2. These arms 27 are offset laterally, as indicated at 29, for a purpose to be explained hereinafter. As shown in Figs. 5 and 6, the arms 27 are connected by a slidably extensible member 30, made up of the tubular member 31 and the graduated member 32 which slides therein. When the parts are in the position shown in Fig. 5, the tread of the car may be read upon the scale on the graduated member 32. The members 31 and 32 are pivotally connected at 33 to the arms 27 so that when members 2 are rotated and the arms 27 are swung to one side or the other the connecting member 30 joining these arms will move longitudinally, as will be seen by comparing Figs. 5 and 6. The scales 28 are carried, respectively, by the members 31 and 32 and the pivots 33 are centered with relation to these scales. Therefore, the arms 27 will swing over the scales 28 and serve as pointers to indicate the amount of rotation of members 2 and, consequently, of the wheel of the vehicle. As will be seen by comparing the two scale readings in Fig. 6, there is a relative shifting of the pointers when the vehicle wheels are turned, as in the act of steering. This is necessitated by the fact that, when making a turn, the inner wheel travels in a smaller circle and must therefore be turned to a greater angle in order to prevent one wheel from side slipping, relative to the other, when making the turn. This is illustrated in Fig. 1 from which it will be seen that, when making a turn, a vehicle must have a center of rotation about which it turns. Also, the front wheels of the vehicle must turn about this center of rotation. The turning radii of these wheels are necessarily perpendicular to the central planes of the wheels. Since the turning radii cannot be coincident or parallel when the vehicle is turning, there is necessarily an angle between these radii and therefore an angle between the planes of the wheels. The angle is indicated by the difference in readings on the two scales in Fig. 6.

It will be veident that if the arms 27 extended radially outwardly from the turntables 2 and one turnable is rotated farther than the other the pivot 33, corresponding to this turntable, will move farther around in its arc and will therefore approach more closely to the axial line of the vehicle axle than will the other pivot 33. Since it is desirable to keep member 30 as nearly parallel to the vehicle axle as possible, the apparatus should be so constructed as to compensate for the more rapid rotation of one of these pivots. Since the pivots 33 are offset toward each other substantially equal amounts (approximately one-half inch), this will result in the bar 30 being parallel to the vehicle axle. We will now assume that the vehicle wheels and, therefore, the turntables 2 are turned slowly to the right. At the beginning of this motion, the left hand pivot 33 approaches very slightly toward the axle, while the right-hand pivot recedes very slightly therefrom. This results in very slight, indeed negligible, lack of parallelism between the bar 30 and the vehicle axle. As the turning is continued, the right hand pivot 33 catches up to the left hand pivot, in angular position, and the bar 30 is again parallel to the axle. From this point on, the right hand pivot approaches the axial line of the axle more rapidly than the left hand pivot and the bar 30 is slightly out of parallelism with the axle. However, the deviation from parallelism becomes zero when the wheels have been turned through the angle previously decided upon for the gauging operation. At the present time, the angle of turn selected is 20°. The left hand wheel, when turning to the right, is therefore turned through this angle, the angle of turn of the other wheel being from 22° to 27°, depending upon the length of wheel base and other factors.

It is apparent that, unless the king pins are in the central planes of the wheels, the outer wheel will move forwardly and the inner wheel rearwardly with relation to the axle, when making a turn. Obviously, this increases the wheel base on the outer side of the turn and decreases that on the inner side. The shorter the wheel base, the less should be the turning angle of the wheel for accomplishing a given turning movement in a given distance.

There are various positions for the king pin. For example, it may either be in the central plane of the wheel or inwardly from that plane. Up to the present time, there has been no attempt to place the king pin outside of said plane. Also, the king pin may be given more or less or no king pin inclination. The effect of toe-in, camber, caster, king pin inclination, and location of king pin on the geometry of the automobile front end belongs to the realm of texts upon that subject-matter and it is not thought necessary to discuss same further herein. It is sufficient to state that the present construction gives accurate readings, even with variations in these factors.

It is of course understood that the specific description of structure set forth above may be departed from without departing from the spirit of my invention as set forth in the appended claims.

Having now described my invention, I claim:

1. A gauge for the purpose indicated comprising a supporting base, a wheel-supporting table operatively connected thereto and mounted thereon for motion in any horizontal direction and for rotation, and means for indicating amount of rotational movement of said table with relation to a movable indicator, said structure having bearings on the table and substantially parallel rollers supported by the bearings, spaced apart, and adapted to receive between them the tire of a vehicle wheel and cause the table to always assume the same position with relation to the tire.

2. A gauge for the purpose indicated comprising supporting means, flat platforms supported upon and spaced at their edges from the supporting means, turntables connected to the platforms for motions of translation and rotation with respect thereto, and series of balls between the platforms and turntables to reduce to a minimum resistance to relative movement thereof, said structure having means for indicating the amount of rotation of the turntables relatively to each other.

3. A gauge for the purpose indicated comprising a pair of spaced bases, a turntable mounted upon each of the bases for rotation in a substantially horizontal plane, a pointer extending laterally from each of said turntables, laterally rigid means connecting said pointers, and protractor means carried by said rigid means and cooperating with said pointers to indicate the relative amounts of rotation of said turntables.

4. A structure as defined by claim 3 in which the laterally rigid means is longitudinally extensible and is provided with means for indicating the distance between the pointers.

5. A gauge comprising a pair of supporting bases each having a platform upon which is mounted a table for motions of rotation and translation in any substantially horizontal direction, means separating the platform and table and permitting ready shifting of the latter with relation to the former, a pointer carried by each table, guiding means carried by the upper surface of each table to receive the tire of a vehicle and cause the table to assume a definite position with relation to the tire, and means connected to the pointers for indicating amounts of rotation of the tables with relation to each other.

6. A structure as defined by claim 5 in which the guiding means comprises pairs of rollers to engage opposite sides of the tires.

7. A structure as defined by claim 5 in which the pointers extend from said table in approximately parallel directions and are offset laterally toward each other.

8. A gauge comprising a pair of supporting bases each having a platform, a table mounted on each platform and having motions of rotation and translation in any substantially horizontal direction, pointers carried by the tables, and means connected to the pointers for indicating relative amounts of rotation of the tables.

9. A gauge comprising a pair of supporting bases each having a platform, a table mounted on each platform and having motions of rotation and translation in any substantially horizontal direction, one of said platforms having means to connect the table and platform so as to prevent motions of translation, pointers carried by the tables, and means connected to the pointers for indicating relative amounts of rotation of the tables.

10. A structure as defined by claim 9 in which the means connecting the pointers is longitudinally extensible but substantially inflexible under conditions of use.

ROY D. SMITH.